United States Patent [19]

Shimizu et al.

[11] Patent Number: 4,868,682
[45] Date of Patent: Sep. 19, 1989

[54] METHOD OF RECORDING AND REPRODUCING VIDEO AND SOUND INFORMATION USING PLURAL RECORDING DEVICES AND PLURAL REPRODUCING DEVICES

[75] Inventors: Yasushi Shimizu; Yoshikazu Ando, both of Hamamatsu, Japan

[73] Assignee: Yamaha Corporation, Hamamatsu, Japan

[21] Appl. No.: 66,863

[22] Filed: Jun. 25, 1987

[30] Foreign Application Priority Data

Jun. 27, 1986 [JP] Japan .................. 61-151075

[51] Int. Cl.⁴ ............................................ H04N 5/76
[52] U.S. Cl. .................................. 358/335; 358/87; 358/341
[58] Field of Search ............... 358/87, 335, 341, 343; 360/19.1, 33.1

[56] References Cited

U.S. PATENT DOCUMENTS

| | | | |
|---|---|---|---|
| 3,542,948 | 11/1970 | Wolff | 358/87 |
| 3,872,238 | 3/1975 | Herndon | 358/87 |
| 3,932,702 | 1/1976 | Shelley et al. | 358/87 |
| 4,355,328 | 10/1982 | Kulik | 358/87 |
| 4,656,506 | 4/1987 | Ritchey | 358/87 |

OTHER PUBLICATIONS

Imax Systems Corporation, "IMAX".

Primary Examiner—Robert L. Richardson
Attorney, Agent, or Firm—Spensley Horn Jubas & Lubitz

[57] ABSTRACT

A method of recording and reproducing video and sound information using plural recording devices and plural reproducing devices is described. An original space in which video and sound information are to be recorded is divided into plural sections. A video recording device and a corresponding sound recording device are provided for each section of the original space. A reproduction space in which video and sound information are to be reproduced is divided into plural sections corresponding to the plural sections of the original space. Synchronous operation of plural video reproducing devices is performed simultaneously with synchronous operation of plural sound reproducing devices so that the picture and sound of each section of the original space are reproduced simultaneously in a corresponding section of the reproduction space. In this manner, synchronization of picture and sound is easily achieved, and the picture and sound of the original space are reproduced with high fidelity.

4 Claims, 4 Drawing Sheets

METHOD OF RECORDING AND REPRODUCING VIDEO AND SOUND INFORMATION USING PLURAL RECORDING DEVICES AND PLURAL REPRODUCING DEVICES

BACKGROUND OF THE INVENTION

This invention relates to a method of recording video and sound information in a field such as a street, a festival or a concert hall and reproducing the recorded information in another place and, more particularly, to a method which facilitates synchronization of picture and sound thereby yielding a vivid and faithful re-creation of an original recorded space.

For ease of discussion, the terms "original space" and "original recorded space" will be used to refer to a space in which video and sound information are recorded. The term "reproduction space" refers to a space in which the video and sound information recorded in an original space are to be reproduced. Also, "video" is used interchangeably with "picture", and "audio" is used interchangeably with "sound."

Prior art video systems for reproducing video information in a space such as a street, a festival or a concert hall, there have been known a dome type video system as shown in FIG. 2 and a cylindrical type video system as shown in FIG. 3. In the dome type image system, a screen is formed over the entire inner surface of a dome-like reproduction space 10 such as a planetarium, pictures of the original space are recorded upon dividing the original space in plural sections, and pictures of the upper hemisphere of the original space are reproduced by projecting the pictures recorded in the respective sections of the original space by plural projectors situated in a central portion or peripheral places of the reproduction space 10 towards corresponding sections of the screen. In the cylindrical video system, a screen is formed over the entire cylindrical inner wall surface of a reproduction space 12, pictures of the original space are recorded upon dividing the original space in several sections, and pictures of the entire horizontal periphery of the original space are reproduced by projecting the pictures recorded in the respective sections of the original space by plural projectors situated in a central portion of the reproduction space 12 towards corresponding sections of the screen.

The sound system which has been used with these video systems is such that sound information collected by using a suitable system such as a stereophonic recording system is sounded through a simulated 4-channel system or other system from loudspeakers 14 disposed at suitable locations of the reproduction spaces 10 and 12 as shown in FIGS. 2 and 3.

The sound system used with the prior art video system requires post-production of sound, i.e., production of sound through the simulated 4-channel system and the like by post-processing of the recorded sound. This results in the problem that synchronization between picture and sound is hard to obtain. Besides, since this post production of sound, including movement of sound image and addition of reverberation, is conducted in a studio in the process of software production, it is extremely difficult to achieve a sufficient presence effect due to difference between the acoustic characteristics of the reproduced sound field and the studio. Furthermore, software production is so difficult due to the necessity for the post-production of sound that there have been very few software products which can be played back using the above mentioned video system.

It is, therefore, an object of the present invention to provide a method of recording and reproducing video and sound information which has eliminated the above described problems of the prior art technique and is capable of readily synchronizing sound with a picture in a reproduction space and thereby reproducing the video and sound information in the original spaces vividly and faithfully.

SUMMARY OF THE INVENTION

For achieving the above described object of the invention, the method according to the invention comprises a step of recording video information for each of the plural spaces defined by dividing an original space in which video information and sound information are to be recorded and recording also sound information in each of the plural spaces simultaneously with the recording of the video information in each of the spaces, and a step of reproducing the video information recorded for each of the plural spaces in a reproduction space and reproducing also the sound information recorded for each of the plural spaces in the reproduction space simultaneously with the reproduction of the video information.

According to the method of the invention, a picture and sound corresponding to this picture in each section of the original space are reproduced respectively from their corresponding location in the reproduction space. The picture and sound are synchronized with each other without fail and the post-processing of the sound in the studio after recording including movement of sound image and addition of reverberation by means of the simulated 4-channel system sound or the like simulated sound system is not required. Accordingly, the post production work is greatly reduced and the video and sound information of the original space can be vividly and faithfully reproduced.

Embodiments of the invention will now be described with reference to the accompanying drawings.

BRIEF DESCRIPTION OF THE DRAWINGS

In the accompanying drawings.

DESCRIPTION OF PREFERRED EMBODIMENTS

Embodiment 1

An embodiment of the invention will now be described. In this embodiment, recording of video and sound is performed by using recording means comprising video recording means having a predetermined visual field and sound recording means having substantially the same sound directivity as the visual field of the video recording means. Reproduction of video and sound is performed by using reproducing means comprising video reproducing means for reproducing the picture recorded in the visual field of video recording means and sound reproducing means disposed within this visual field.

(1) Recording

Figure 1:
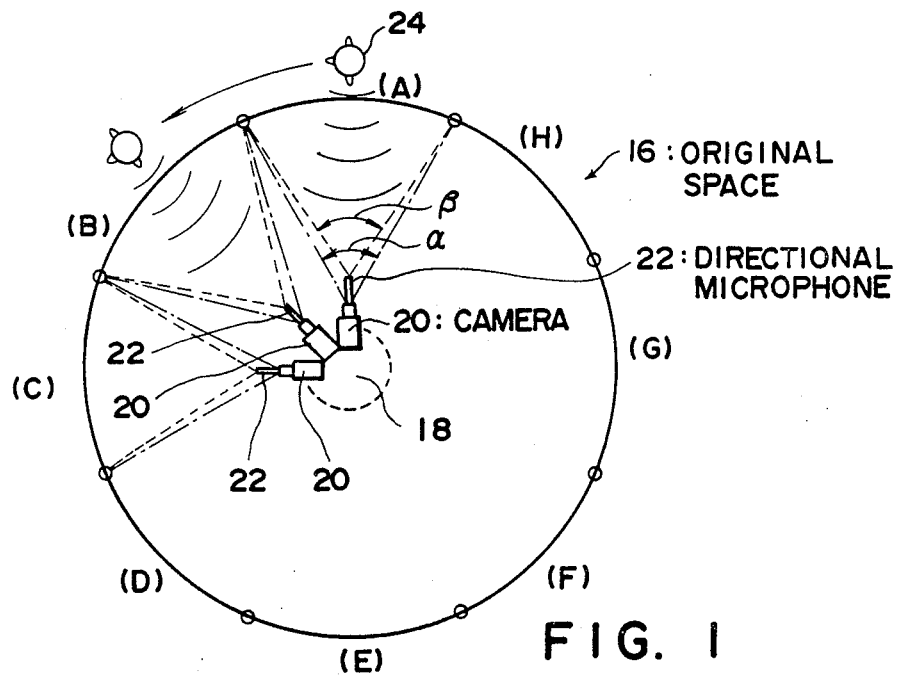
FIG. 1 is a plan view of an embodiment of the invention showing a step of recording information in the original space.

FIG. 1 shows, in a plan view, an example of a manner of recording information in an original space (e.g., a street, a festival or a concert hall) in accordance with the method of the present invention. In this example, an original space 16 is equally divided into eight sections A through H which are horizontally continuous about a central recording spot 18. Eight cameras 20 (e.g., 16 mm or 8 mm movie cameras or 35 mm slide film cameras) each having a predetermined visual field angle $\alpha$ ($\approx 45$) and eight directional microphones 22 each having a predetermined directivity $\beta$ ($\approx 45$) are disposed in the recording spot 18, each camera and microphone being directed to the center of the periphery of the respective sections A through H. A picture and sound in each of the sections A through H are thereby recorded synchronously. By this arrangement, the manner of moving of an object 24 in the space is recorded with respect both to picture and sound.

Figure 4:
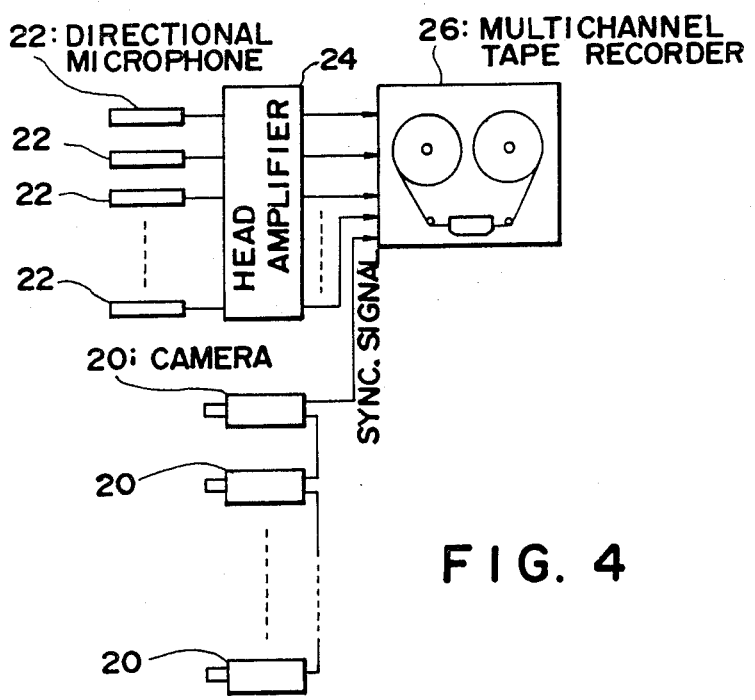
FIG. 4 is a block diagram showing an example of a device for effecting the recording operation shown in FIG. 1.

FIG. 4 shows an example of a device for effecting recording in the original space 16. The eight cameras 20 directed to the respective sections A through H take pictures of images in the respective sections A through H in synchronism with each other. Audio signals which have been collected by the eight directional microphones 22 are recorded on respective tracks of a magnetic tape by a multichannel tape recorder 26 through a head amplifier 24. The tape recorder 26 is driven in synchronism with the cameras 20. In this manner, the pictures and sound of the respective spaces A through H are synchronously recorded by the cameras 20 and the multichannel tape recorder 26.

(2) Reproduction

Figure 2:
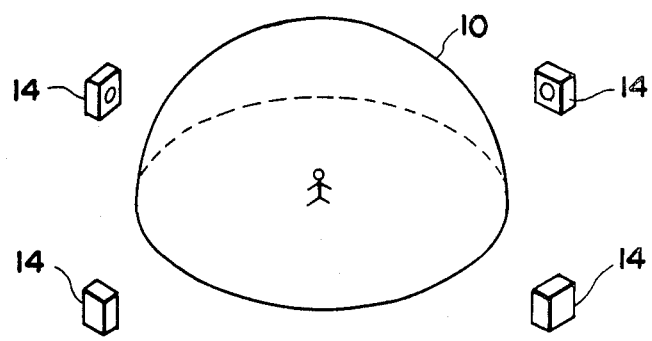
FIG. 2 is a perspective view showing an arrangement of loudspeakers in the prior art dome type reproduction space.
Figure 3:
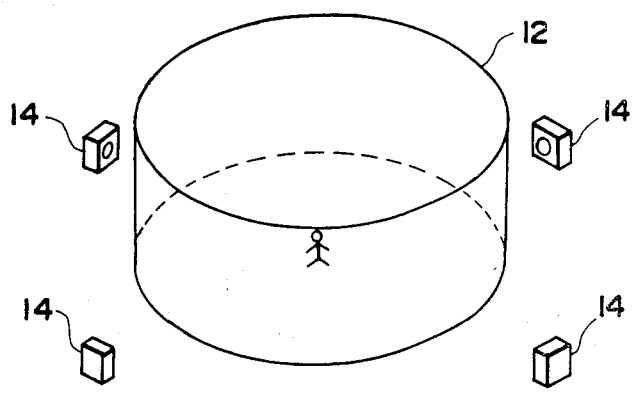
FIG. 3 is a perspective view showing an arrangement of loudspeakers in the prior art cylindrical type reproduction space.
Figure 5:
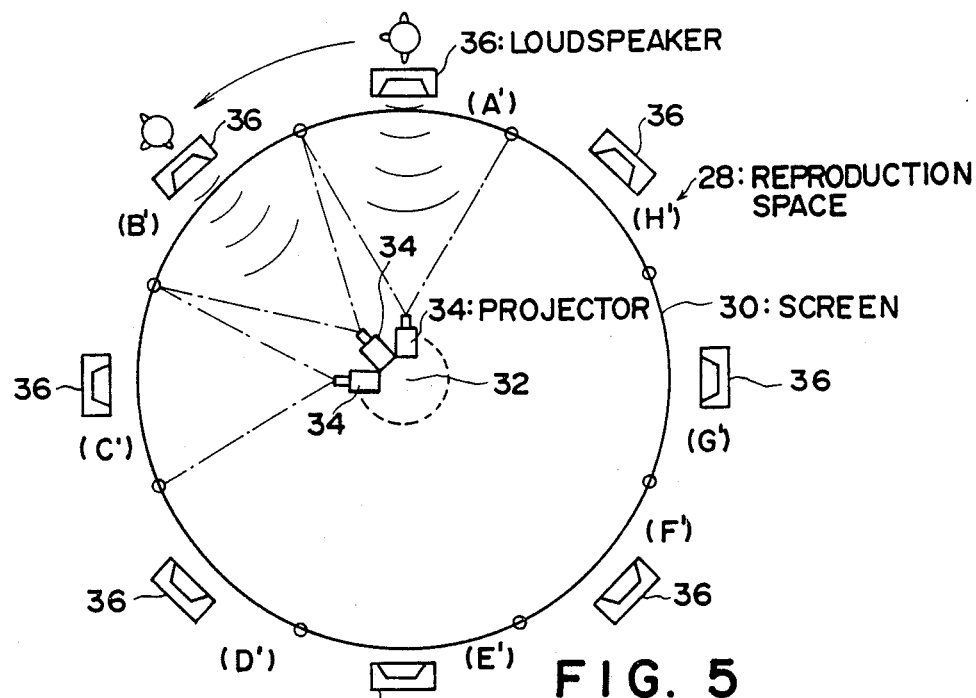
FIG. 5 is a plan view showing a step of reproducing in a reproduction space the information recorded in the original space shown in FIG. 1.

FIG. 5 shows, in a plan view, an example of a manner of reproducing, in a reproduction space 28, information which has been recorded in the original space 16 in FIG. 1. The reproduction space 28 is formed in a suitable shape such as the dome type space as shown in FIG. 2 or the cylindrical type space as shown in FIG. 3. The reproduction space 28 should preferably be an anechoic room or a room closely similar to an anechoic room. A screen 30 is provided on the entire inner surface of the reproduction space 28. The reproduction space 28 is divided in eight sections A' through H' in correspondence to the sections A through H of the original space 16 in which recording of the information has been made. In a central portion 32 of the reproduction space 28, there are eight projectors 34 directed to the center of the periphery of the respective sections A' through H'. Eight loudspeakers 36 are provided at the center of the periphery of the respective sections A' through H' at the back of the screen 30.

Figure 6:
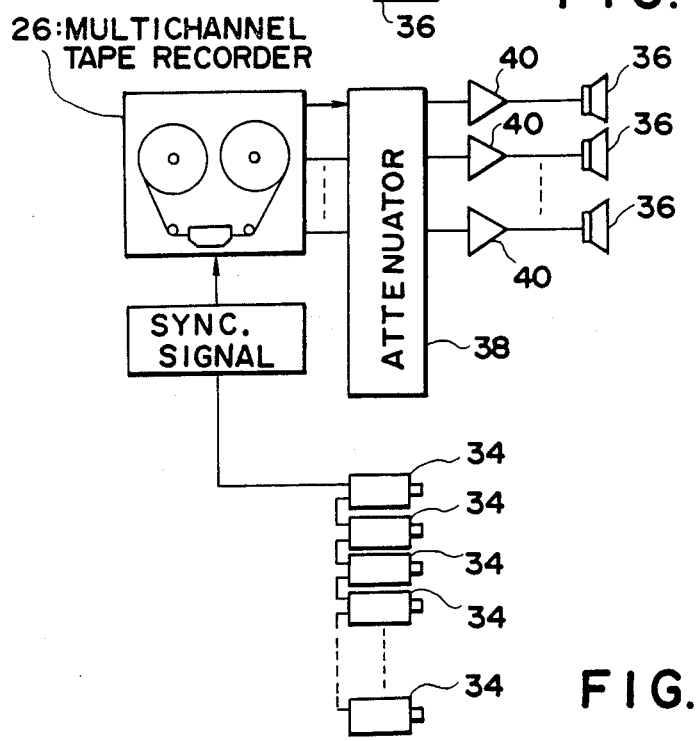
FIG. 6 is a block diagram showing an example of a device for effecting the reproducing operation shown in FIG. 5.

FIG. 6 shows an example of a device for reproducing, in the reproduction space 28, the picture and sound recorded by the recording device shown in FIG. 4. The eight projectors 34 directed to the screen 30 of the respective sections A' through H' are driven in synchronism with each other and project the reproduced pictures of the sections A through H of the original space 16 on the screen 30 of corresponding sections A' through H'. A multichannel tape recorder 26, in synchronism with the projector 34, reproduces sound in the sections A through H of the original space 16 and supplies the reproduced sound to loudspeakers 36 disposed in corresponding sections A' through H' of the reproduction space 28 through an attenuator 38 and an amplifiers 40. In this manner, the pictures and sound in the sections A through H of the original space 16 are reproduced from the sections A' through H' of the reproduction space 28 and the video and sound information of the original space 16 thereby is reproduced.

Embodiment 2

In the above described embodiment, description has been made with respect to a case where pictures are recorded by using 16 mm or 8 mm movie cameras or 35 mm slide cameras. The pictures may be recorded and reproduced by using a video tape recorder. Description will now be made about an embodiment using a video tape recorder.

(1) Recording

Figure 7:
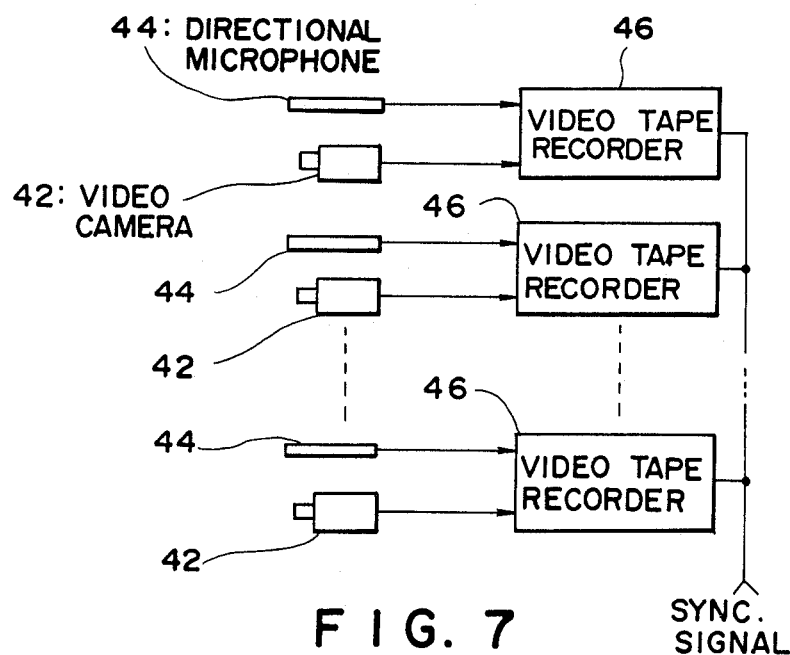
FIG. 7 is a block diagram showing an example of a device for effecting the recording operation using a video tape recorder.

FIG. 7 shows an example of a device for recording information. Video cameras 42 and directional microphones 44 are disposed in the original space 16 in the same manner as in FIG. 1 to collect pictures and sound in the respective sections A through H of the original space 16. The collected pictures and sound are recorded by video tape recorders 46 provided for the respective sections A through H. A synchronizing signal is also recorded simultaneously with the pictures and sound for achieving synchronization of the video tape recorders 46 during reproduction.

(2) Reproduction

Figure 8:
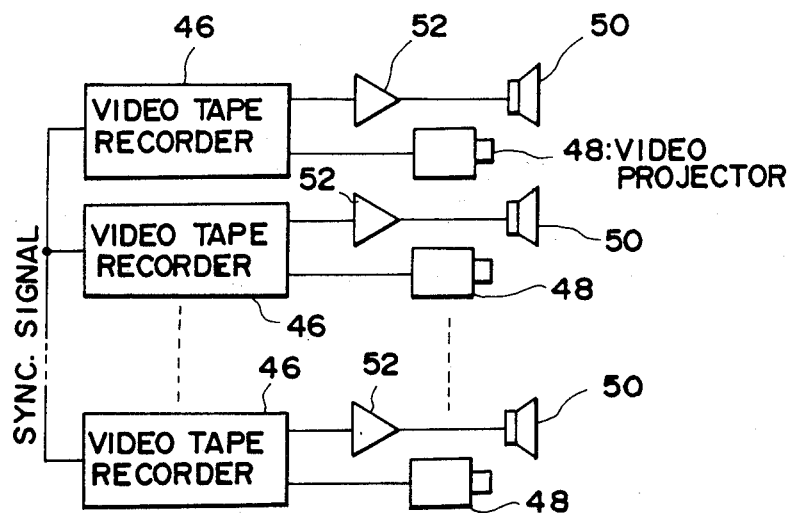
FIG. 8 is a block diagram showing an example of a device for effecting the reproducing operation using the video tape recorder recorded by the step of FIG. 7.

FIG. 8 is an example of a device for playing back the video tape recorded by the video tape recorders 46 of FIG. 7. A reproduction space is formed by the dome-type reproduction space or the cylindrical reproduction space and a screen is provided over the inner surface of the reproduction space as in the embodiment shown in FIG. 5. Video projectors 48 are provided in a central portion of the reproduction space 28 and are directed to the respective sections A' through H' in the same manner as in FIG. 5. Loudspeakers 50 are provided at the back of the screen of the respective sections A' through H' as in FIG. 5. The video tape recorders 46 are driven in synchronism with one another by the recorded synchronizing signal. Video signals reproduced by the video tape recorders 46 are supplied to the video projectors 48 for projection of pictures on the screen of the respective sections A' through H'. In the meanwhile, audio signals are supplied to the loudspeakers 50 through amplifiers 52. In this manner, the pictures and sound in the respective sections A through H of the original space 16 are reproduced from the sections A' through H' of the reproduction space 28 and the video and sound information of the original space 16 is thereby reproduced in the reproduction space 28.

Modifications

In the above described embodiments, the space is horizontally divided in eight sections. The number of divisions may however be determined at any desired number. The direction of division of the space need not necessarily be horizontal but it may be vertical or a combination of horizontal and vertical directions.

What is claimed is:

1. A method of recording and reproducing video and sound information comprising:
    a step of recording video information separately for each of plural visual fields defined by dividing an overall visual field from which video information and sound information are to be recorded and recording also sound information separately for each of said plural visual fields simultaneously with the recording of said video information in each of said plural visual fields, whereby for each visual field recording there is a corresponding sound recording; and
    a step of reproducing said video information recorded for each of said plural visual fields and reproducing also said sound information recorded for each of said plural visual fields simultaneously with the reproduction of said video information.

2. A method of recording and reproducing video and sound information as defined in claim 1 wherein said recording for each visual field is performed by video recording means having a predetermined visual field and sound recording means having sound directivity which is substantially the same as said visual field.

3. A method of recording and reproducing video and sound information as defined in claim 2 wherein said reproduction is performed by video reproducing means for reproducing said video information recorded in said visual field of said video recording means and sound reproducing means disposed within a visual field of the video reproducing means.

4. A method of recording an reproducing video and sound information comprising the steps of:
    dividing an original space from which video information and sound information are to be recorded into plural sections;
    recording video information and sound information simultaneously from each of the plural sections, the sound information recorded in each of the plural sections substantially corresponding to the visual field of that particular section;
    dividing a reproduction visual field in which video information and sound information are to be reproduced into plural sections corresponding to the plural sections of the original space from which video information and sound information were recorded; and
    reproducing in each section of the reproduction visual field the video information recorded from the corresponding section of the original space simultaneously with the sound information recorded from the corresponding plural section of the original space.

* * * * *